United States Patent
Asokan et al.

(10) Patent No.: US 7,821,749 B2
(45) Date of Patent: Oct. 26, 2010

(54) ARC FLASH ELIMINATION APPARATUS AND METHOD

(75) Inventors: Thangavelu Asokan, Karnataka (IN); Gopichand Bopparaju, Karnataka (IN); Adnan Kutubuddin Bohori, Karnataka (IN)

(73) Assignee: General Electric Company, Niskayuna, NY (US)

( * ) Notice: Subject to any disclaimer, the term of this patent is extended or adjusted under 35 U.S.C. 154(b) by 717 days.

(21) Appl. No.: 11/693,849

(22) Filed: Mar. 30, 2007

(65) Prior Publication Data

US 2008/0239598 A1    Oct. 2, 2008

(51) Int. Cl.
*H02H 3/00*    (2006.01)

(52) U.S. Cl. .................. 361/1; 361/3; 361/5; 361/6; 361/67

(58) Field of Classification Search ............... 361/2–14, 361/67
See application file for complete search history.

(56) References Cited

U.S. PATENT DOCUMENTS

| | | | |
|---|---|---|---|
| 3,575,680 A * | 4/1971 | Beaudoin et al. ............ | 335/201 |
| 3,588,578 A * | 6/1971 | Clinkenbeard ............. | 313/325 |
| 3,997,235 A | 12/1976 | Boliver | |
| 4,259,704 A | 3/1981 | Hamann | |
| 4,289,941 A | 9/1981 | Cannon | |
| 4,347,414 A | 8/1982 | Headley et al. | |
| 4,369,364 A | 1/1983 | Kuntermann | |
| 4,409,447 A | 10/1983 | Noeske | |
| 4,431,946 A * | 2/1984 | O'Loughlin ............... | 315/150 |
| 4,645,889 A | 2/1987 | Howell | |
| 5,231,242 A * | 7/1993 | Chryssomallis et al. ......... | 89/8 |
| 5,650,902 A | 7/1997 | Holger | |
| 5,905,244 A | 5/1999 | Smith et al. | |
| 5,933,308 A | 8/1999 | Garzon et al. | |
| 6,128,168 A | 10/2000 | Arnold et al. | |
| 6,141,192 A | 10/2000 | Garzon | |
| 6,207,916 B1 | 3/2001 | Pniok et al. | |

(Continued)

FOREIGN PATENT DOCUMENTS

DE    4236623 A1    5/1994

(Continued)

OTHER PUBLICATIONS

Pulsed Power. Mesyats. Dec. 21, 2007.*

(Continued)

*Primary Examiner*—Jared J Fureman
*Assistant Examiner*—Christopher J Clark
(74) *Attorney, Agent, or Firm*—Richard D. Emery

(57) ABSTRACT

An arc crowbar with electrodes separated by a gap in a protective case. Each electrode is connected to an electrically different conductor of a circuit. A sensor detects an arc flash condition on the circuit and signals a trigger circuit to send an electrical pulse to an arc-triggering device in the arc crowbar gap. The triggering device ionizes a portion of the gas between the electrodes, initiating a protective arc between the electrodes that absorbs energy from the power circuit and trips a breaker, eliminating the arc flash condition. The triggering device may be a plasma gun, especially one that injects plasma of an ablated material into the gap. The sensor may signal a circuit breaker to open in the power circuit. Arc flash sensor types may include a differential current sensor and/or an optical sensor.

16 Claims, 5 Drawing Sheets

U.S. PATENT DOCUMENTS

| | | | |
|---|---|---|---|
| 6,232,857 | B1 | 5/2001 | Mason, Jr. et al. |
| 6,242,707 | B1 | 6/2001 | Mody et al. |
| 6,417,671 | B1 | 7/2002 | Tiemann |
| 6,433,976 | B1 | 8/2002 | Phillips |
| 6,532,140 | B1 | 3/2003 | McMahon et al. |
| 6,633,009 | B1 | 10/2003 | Shea |
| 6,657,150 | B1 | 12/2003 | Shea et al. |
| 6,683,764 | B1 | 1/2004 | Pniok |
| 6,751,528 | B1 | 6/2004 | Dougherty |
| 6,839,209 | B2 | 1/2005 | Shea et al. |
| 6,952,332 | B2 | 10/2005 | Slade et al. |
| 7,062,388 | B2 | 6/2006 | Rivers, Jr. et al. |
| 2003/0231443 | A1 | 12/2003 | Shea et al. |
| 2003/0231453 | A1 | 12/2003 | Shea |

FOREIGN PATENT DOCUMENTS

| | | | |
|---|---|---|---|
| EP | 688071 | A1 | 8/1999 |
| EP | 771057 | A1 | 9/2000 |
| JP | 04255421 | A | 9/1992 |
| JP | 04289721 | A | 10/1992 |
| JP | 05003611 | A | 1/1993 |
| WO | WO 9522167 | A2 | 8/1995 |
| WO | WO 9835237 | A2 | 8/1998 |
| WO | WO 9921254 | A1 | 4/1999 |
| WO | WO 9921255 | A1 | 4/1999 |
| WO | WO 2005036709 | A1 | 4/2005 |

OTHER PUBLICATIONS

Publication Titled: Bypass Gap, by GE Transmission, Distribution & Industrial Systems, regarding Series Compensation Systems, dated Nov. 14, 1999.

* cited by examiner

ARC FLASH ELIMINATION APPARATUS AND METHOD

BACKGROUND

The present invention relates to arc flash prevention and mitigation technologies, and particularly relates to electrical crowbar devices for this purpose.

Electric power circuits and switchgear have conductors separated by insulation. Air space often serves as part or all of this insulation in some areas. If the conductors are too close to each other or voltage exceeds the insulation properties, an arc can occur between conductors. Air or any insulation (gas or solid dielectrics) between conductors can become ionized, making it conductive, which enables arcing. Arc temperature can reach as high as 20,000° C., vaporizing conductors and adjacent materials, and releasing an explosive energy that destroys circuits and endangers personnel, even at a distance. For example, an arc of 10 kA/480V has the energy of about 8 dynamite sticks. Approximately five to ten serious arc flash incidents occur in the United States daily.

Arc flash is the result of a rapid energy release due to an arcing fault between phase-phase, phase-neutral, or phase-ground. An arc flash can produce high heat, intense light, pressure waves, and sound/shock waves similar to that of an explosion. However, the arc fault current is usually much less than a short circuit current, and hence delayed or no tripping of circuit breakers is expected unless the breakers are selected to handle an arc fault condition. Agencies and standards such as the National Environmental Policy Act (NEPA), Occupational Safety and Health Administration (OSHA), and Institute of Electrical and Electronics Engineers (IEEE) regulate arc flash issues through personal protective clothing and equipment, but there is no device established by regulation to eliminate arc flash.

Present arc flash mitigation technologies are not satisfactory. Standard fuses and circuit breakers do not react fast enough to an arc flash. An electrical "crowbar" is a protection device that intentionally shorts an electrical circuit and thus diverts the electrical energy away from the arc flash. The intentional 3-phase short circuit fault thus created is then cleared by tripping a fuse or circuit breaker, finally shutting down the power. Examples of prior art arc flash mitigation devices are disclosed in U.S. Pat. Nos. 6,141,192, 6,532,140, 6,633,009, 6,839,209, and international patent publication WO9921254. However, circuit breakers that rely on mechanical and/or electro-mechanical processes may be too slow to stop an arc flash before damage occurs.

BRIEF DESCRIPTION OF THE INVENTION

An aspect of the invention resides in a method for eliminating an arc flash on an electrical circuit by diverting energy to an arc crowbar in an explosive pressure containment vessel.

Another aspect of the invention resides in monitoring an electrical circuit with one or more specialized arc flash detection devices connected to a logic circuit that determines when an arc flash occurs. The logic circuit then generates both a trigger signal to an arc crowbar and a trip signal to a signal-controlled circuit breaker on the electrical circuit.

Another aspect of the invention resides in an arc crowbar device with gap electrodes in a pressure containment vessel. An arc-triggering device between the electrodes ionizes a portion of the gas between the electrodes or injects a plasma into the gap to initiate a protective arc between the electrodes.

Another aspect of the invention resides in an ablative plasma gun provided as an arc crowbar triggering device that injects a plasma of ablated material into the gap between the electrodes of the arc crowbar to initiate protective arcing and lower the gap impedance for fast and effective arc flash elimination and breaker tripping.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
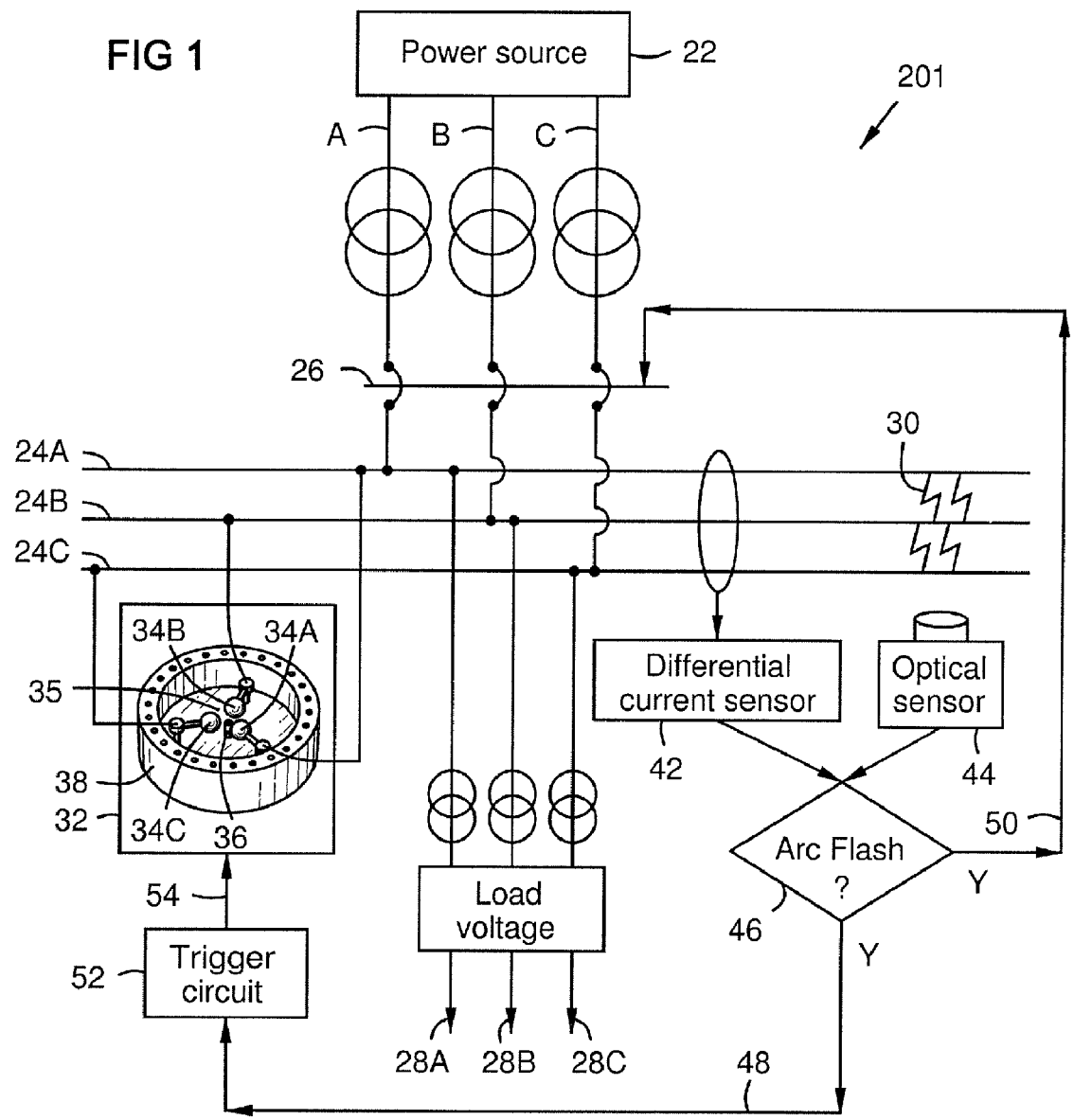
FIG. 1 is schematic view of an electrical circuit with an arc crowbar and activation circuits according to aspects of the invention.

The inventors of the present invention have innovatively recognized that a controlled arc can act as an electrical crowbar for arc flash elimination, and that such a controlled arc can be faster than existing crowbars, providing better protection for circuits and personnel. FIG. 1 shows an electrical circuit 201 with a power source 22, providing 3-phase electrical power A, B, C to three respective buses 24A, 24B, 24C protected by a signal controllable circuit breaker 26. Power is provided via the buses to one or more loads 28A, 28B, 28C.

The circuit breaker 26 will open in case of a short circuit. However, it may not open in case of an arc flash 30 because the current flowing across an arc flash is lower than the bolting current of a short circuit which trips a circuit breaker. Furthermore, a mechanical breaker is too slow to prevent damage and hazard from an arc flash.

To solve this problem, an arc crowbar 32 is connected in the circuit to quickly eliminate an arc flash according to aspects of the invention. It provides a gap electrode 34A, 34B, 34C connected to each respective phase A, B, C. A gap 35 or gaps separate these electrodes from each other. The gap may be in air or another insulating gas such as nitrogen, sulphur hexafluoride, or any other suitable inert gas. A trigger device 36 in the gap 35 ionizes a localized portion of the insulating gas to initiate protective arcing 37 between the electrodes. This protective arcing quickly absorbs energy from the electrical circuit, eliminating the hazardous arc 30. The electrodes 34A, 34B, 34C are enclosed in a strong, pressure tolerant vessel or case 38 which may include an acoustic shock wave absorber 41 to withstand the explosive energy of the protective arc. The case 38 may be a pressure containment vessel made, for example, of steel, other metals or alloys, or plastic composites that can withstand the explosive equivalent of a calculated amount of TNT.

The low current of an arc flash makes early detection more difficult. For this reason one or more suitable sensors such as a differential current sensor 42 and/or an optical sensor 44 may be provided to detect an arc flash 30. Such sensors are known in the art. For example differential current sensor technology is described in U.S. Pat. Nos. 6,751,528 and 6,232,857 of the present assignee. The optical sensor 44 may be any type of optical sensor known in the art, such as the optical sensor described in U.S. Pat. No. 4,369,364.

The sensors 42, 44 are connected to a logic circuit 46 that produces a crowbar trigger activation command 48 upon detection of an arc 30. This instructs a trigger circuit 52 to provide a pulse 54 to the trigger 36, causing the trigger to ionize some gas in the gap 35 between the electrodes 34A, 34B, and 34C. This lowers the gap impedance, initiating a protective arc between the electrodes. The crowbar gap 35 may be designed for a given circuit voltage by the size and separation of the electrodes 34A, 34B, 34C, and by providing ablative material in the trigger as later described. Triggering lowers the impedance across the electrodes 34A, 34B and 34C so that the system current flows within the crowbar.

The gap 35 impedance may be designed to support an arc that draws enough current to open the circuit breaker. In addition to this, a circuit breaker trip signal 50 may be produced by the logic circuit 46 to open the circuit breaker 26. However, elimination of the arc flash is accomplished by the protective arc 37 before the circuit breaker has time to open.

Figure 2:
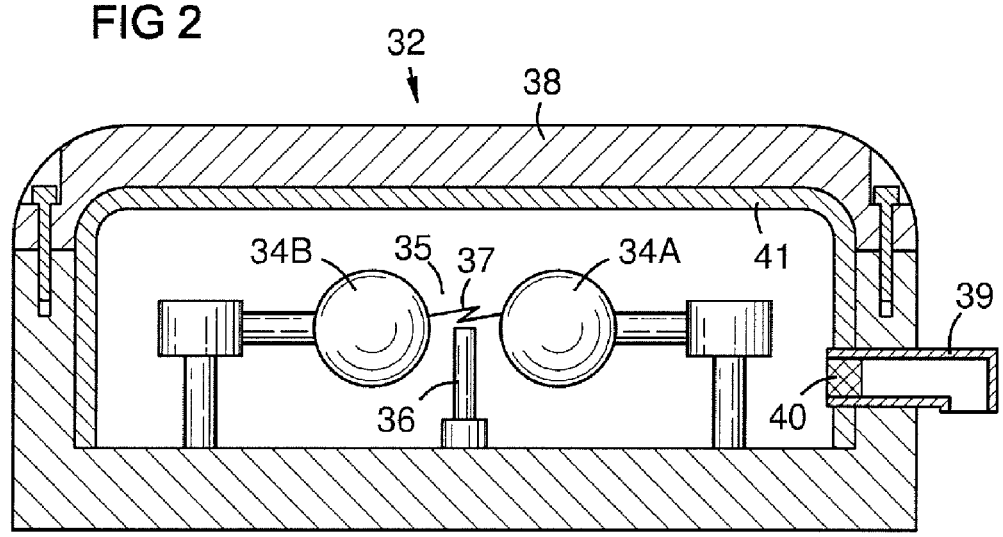
FIG. 2 is a sectional view of an arc crowbar case with sphere electrodes and a trigger pin.
Figure 3:
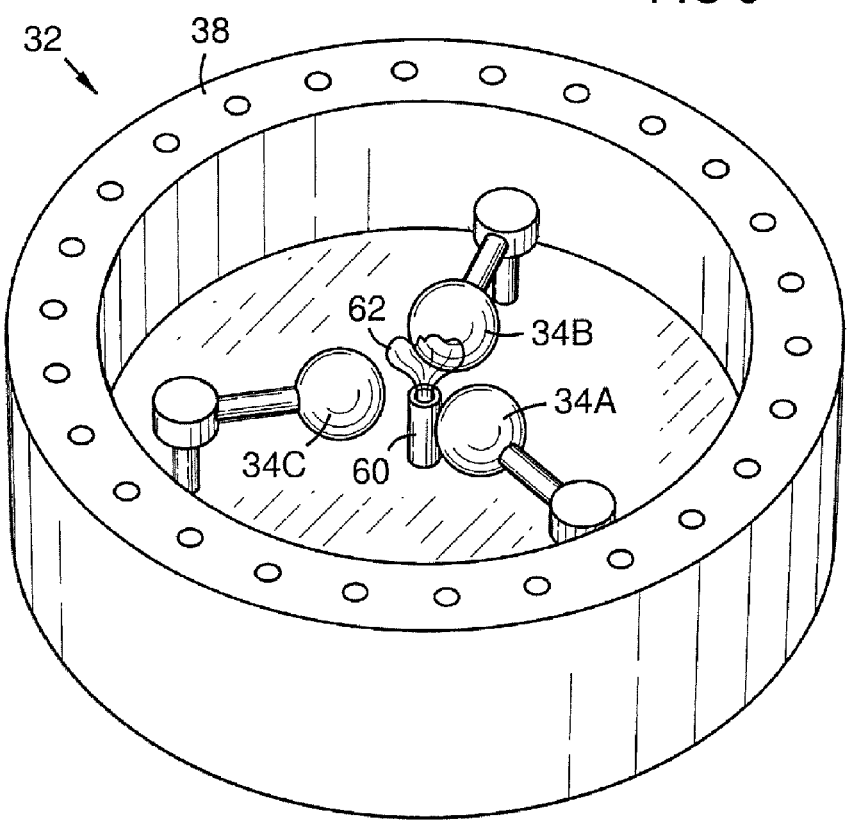
FIG. 3 is a perspective view of an arc crowbar with a plasma gun trigger.

FIG. 2 shows a sectional view of an arc crowbar case 38 with sphere electrodes 34A, 34B, and a trigger 36. The case may include a damping layer 41 to absorb the acoustical shock wave produced by the protective arc 37. The trigger 36 may be an electrode pin 36, an electrode pair, or a heating element that receives a pulse of current sufficient to ionize some of the gas between the main electrodes 34A, 34B. Alternately, the trigger may be an ablative plasma gun 60 that injects a plasma of ablated material such as Teflon®, Delrin®, Poly-methyle methacralate (PMMA) or any ablative polymers at supersonic speed into the inter-electrode gap 35. This creates a conducting channel between the electrodes, lowering the gap impedance quickly and dramatically for a fast and protective crowbar current response. FIG. 3 is a perspective view of an arc crowbar with three sphere electrodes 34A, 34B, 34C and a plasma gun trigger 60 injecting a plasma 62 between the electrodes. One or more pressure relief vents 39 may be provided in the case 38. These vents may be constantly open, controlling the release rate by the vent size, or they may open only when pressure exceeds a given safe threshold by means of a valve or a burst plate. A filter 40 may be provided to prevent release of particulates. The internal wall of the vent may be made of ablative materials (e.g., Teflon, Delrin, PMMA, or Nylon etc.,) to cool the hot vapors and particulates, prior to venting outside the container.

Figure 4:
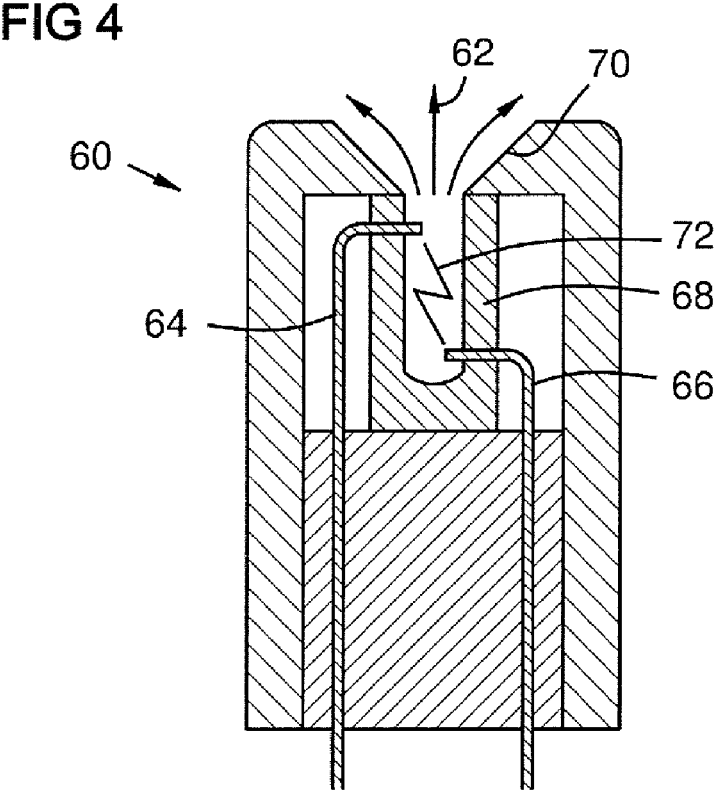
FIG. 4 is a sectional view of an ablative plasma gun trigger.

FIG. 4 is a sectional view of a plasma gun 60 with first and second electrodes 64, 66, a cup of ablative material 68 and a divergent nozzle 70. A brief pulse of electrical potential between the electrodes 64, 66 creates an arc 72 that heats and ablates some of the cup material 68 to create a highly conductive plasma 62. This plasma is injected in the gap 35 between the sphere electrodes 34A, 34B, and 34C as shown in FIG. 3 to initiate a protective arc 37.

Figure 5:
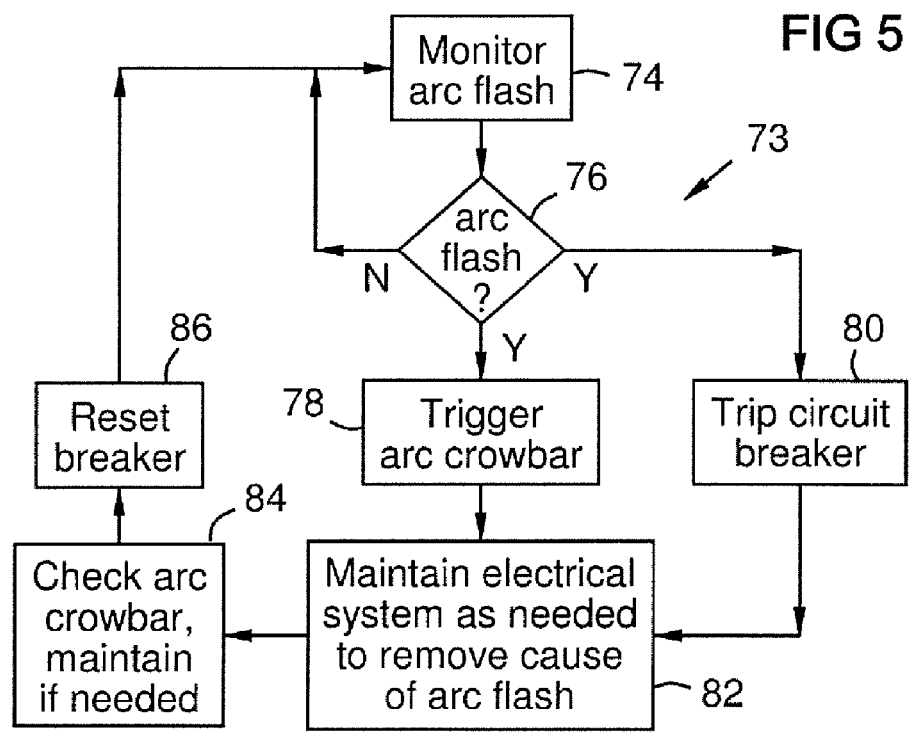
FIG. 5 is a flowchart of an arc flash elimination method

FIG. 5 schematically shows a method 73 for arc flash elimination according to aspects of the invention. This includes continuously sensing the circuit 74 for an arc flash, determining 76 when an arc flash occurs, then triggering 78 an arc crowbar and tripping 80 a circuit breaker, then maintaining 82 the electrical system to eliminate the cause of the arc flash, checking 84 the arc crowbar for wear, and maintaining it if needed, and finally, resetting 86 the circuit breaker, returning the electrical system to service.

It has been found in experimental testing that an arc crowbar embodying aspects of the present invention is faster than any other known arc flash elimination technologies. This arc crow bar was operated with an ablative plasma trigger and was tested in 3-phase circuits of 10-65 kilo Amperes. It achieved an energy transfer time of less than 0.2 ms after triggering with an 8/20 microsecond trigger pulse of 5 kA current. This response is about 15 times faster than the approximately 3 ms response time of the mechanical arc fault protection system described in U.S. Pat. No. 5,933,308 for example. The present arc crowbar avoids damage to the electrical circuit 201 from the sudden surge of bolting current produced by a mechanical crowbar. The present crowbar absorbs 10-20% of the energy in the electrical system, as opposed to none absorbed by a mechanical crowbar. Furthermore, a crowbar embodying aspects of the present invention is robust, scalable, can be reusable several times before reconditioning, and should be less expensive and more reliable than other technologies, since it has no moving parts. The ablative plasma gun requires little activation energy as noted above, and also has no moving parts.

The impedance of the inter-electrode gap 35 can be designed and controlled by various parameters, including the gap electrode size and spacing and the trigger plasma characteristics. The plasma characteristics are determined by the spacing of the plasma gun electrodes 64, 66, the ablative cup 68 interior dimensions, the trigger pulse shape and energy, and the material of the cup 68. For example, in successful testing mentioned above, the crowbar electrodes 34A, 34B, 34C were 40 mm diameter spheres, each spaced 25 mm from the adjacent sphere or with sphere centers located at a radius of 37.52 mm from a common center point. The trigger was an ablative plasma gun 60 with a cup 68 made of Delrin® with an inner chamber diameter of 3 mm and chamber length of 8 mm. The nozzle 70 was located about 25 mm below the plane of the electrode 34A, 34B, 34C sphere centers. The cup 68 may be made of other ablative materials, as mentioned above, or combinations of materials if desired.

Figure 6:
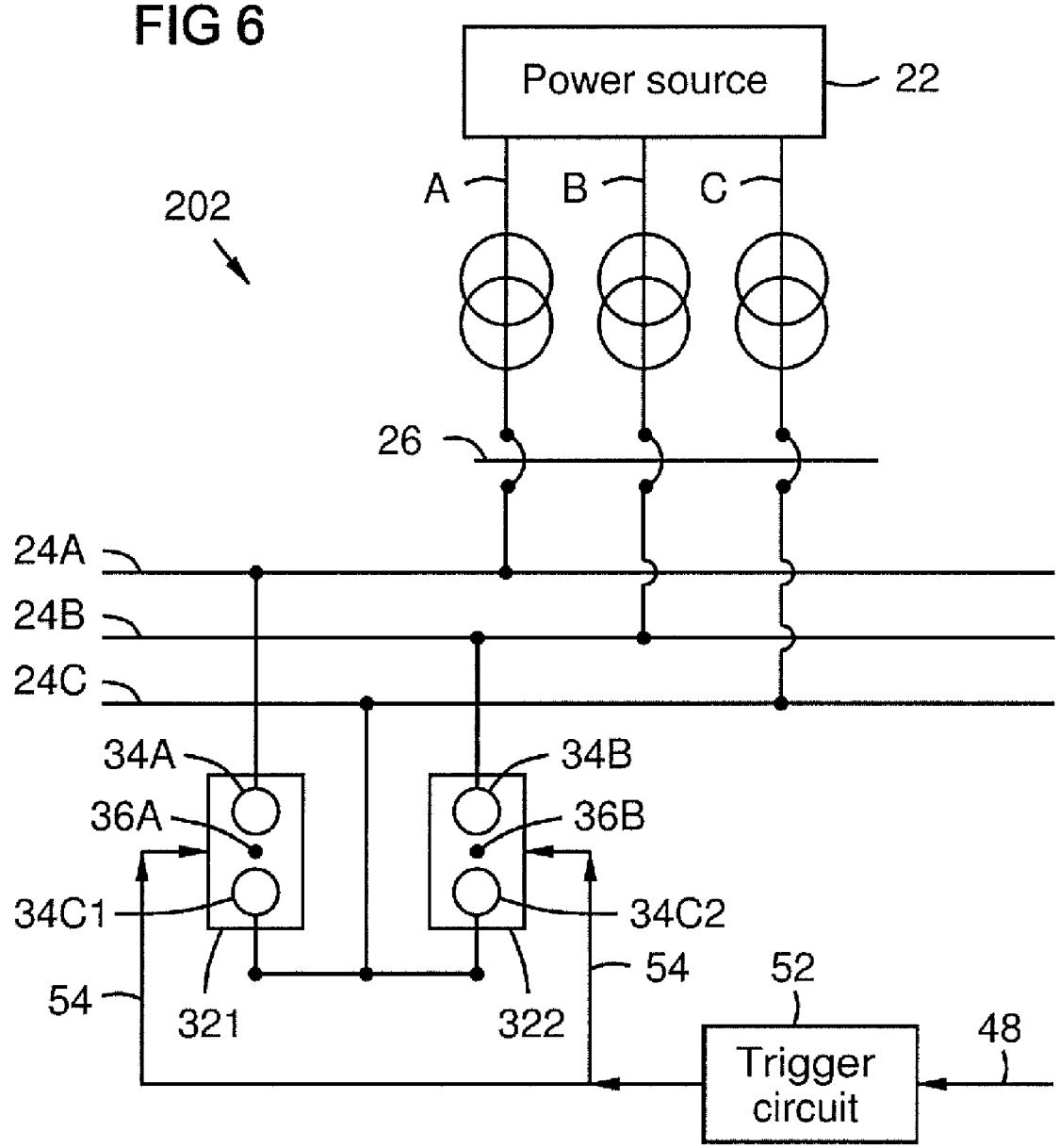
FIG. 6 is a schematic view of a second embodiment of an arc crow bar embodying aspects of the invention.

The present apparatus may be configured in a variety of ways. For example, multiple arc crowbar units may be configured to protect a circuit. FIG. 6 shows a second embodiment 202 of an arc crow bar embodying aspects of the invention such as comprising two arc crowbars 321, 322. The first arc crowbar 321 has first and second electrodes 34A, 34C1 separated by a first gap with a first arc triggering device 36A. The first electrode 34A is connected to a first phase A of the electrical circuit, and the second electrode 34C1 is connected to a third phase C of the electrical circuit. The second arc crowbar 322 has third and fourth electrodes 34B, 34C2 separated by a second gap with a second arc triggering device 36B. The third electrode 34B is connected to a second phase B of the electrical system and the fourth electrode 34C2 is connected to the third phase C of the electrical system.

Figure 7:
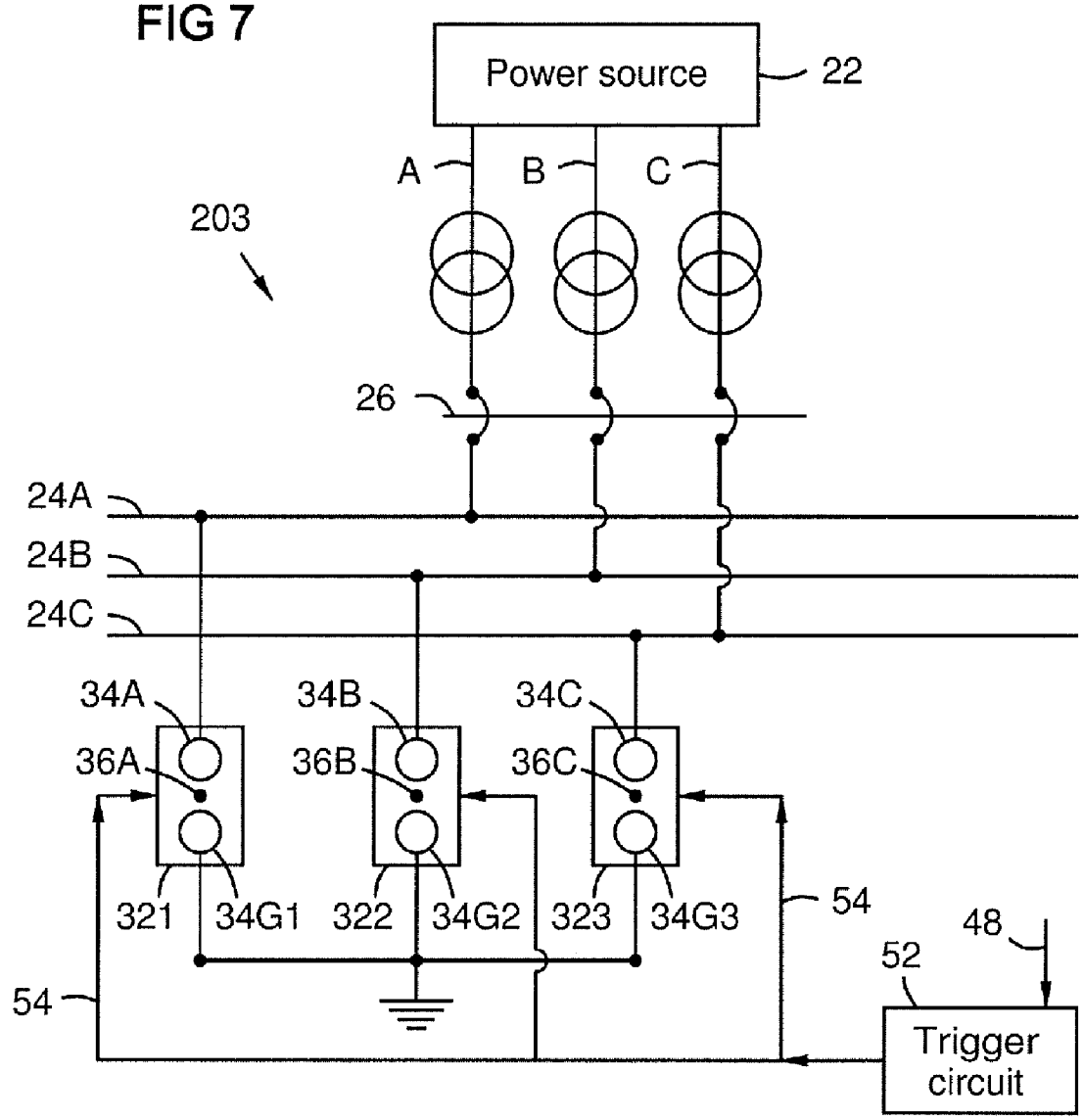
FIG. 7 is a schematic view of a third embodiment of an arc crow bar embodying aspects of the invention.

FIG. 7 shows a third embodiment 203 of an arc crow bar embodying aspects of the invention such as comprising three arc crowbars 321, 322, 323. The first arc crowbar 321 has first and second electrodes 34A, 34G1 separated by a first gap with a first arc triggering device 36A. The first electrode 34A is connected to a first phase A of the electrical circuit. The second electrode 34G1 is connected to a ground. The second arc crowbar 322 has third and fourth electrodes 34B, 34G2 separated by a second gap with a second arc triggering device 36B. The third electrode 34B is connected to a second phase B of the electrical system and the fourth electrode 34G2 is connected to the ground. The third arc crowbar 323 has fifth and sixth electrodes 34C, 34G3 separated by a third gap with a third arc triggering device 36C. The fifth electrode 34C is connected to a third phase C of the electrical system and the sixth electrode 34G3 is connected to the ground.

Arc crowbars according to the invention may be provided in modular units such as 321, 322, and 323 that can be installed in different configurations as shown in FIGS. 6 and 7. The main electrodes of these units may be provided with gap adjustment for adaptation to different voltages.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of eliminating arc flash in an electrical circuit, comprising:
   sensing an arc flash in the electrical circuit;
   in response to said arc flash sensing, triggering a protective arc in a gap between electrodes in a pressure containment vessel; and
   in response to the triggering of the protective arc, absorbing energy from the electrical circuit to eliminate the arc flash condition on the electrical circuit,
   wherein the protective arc is triggered by an ablative plasma gun that injects a plasma of ablated material into the gap.

2. The method of claim 1 further comprising triggering the gap to a low enough impedance that the protective arc trips a circuit breaker in the electrical circuit.

3. The method of claim 1 further comprising tripping a signal-controllable circuit breaker on the electrical circuit via a trip signal upon sensing the arc flash in the electrical circuit.

4. An arc flash eliminator comprising:
   a protective arc device comprising gap electrodes separated by a gap in a gas in an enclosed case, each electrode connected to an electrically different portion of an electrical circuit;
   an arc triggering device in the gap that initiates a protective arc between the electrodes that absorbs energy from the electrical circuit;
   a trigger circuit that sends an electrical pulse to the arc triggering device to activate it; and
   an arc flash sensor that signals the trigger circuit to send the electrical pulse to the arc triggering device when the sensor detects an arc flash condition on the electrical circuit;
   wherein an arc flash condition on the electrical circuit results in triggering the protective arc device to produce a protective arc that diverts energy from the arc flash condition, and
   wherein the arc triggering device comprises an ablative plasma gun that injects a plasma of an ablated material into the gap between the gap electrodes to initiate the protective arc between the gap electrodes.

5. The arc flash eliminator of claim 4, further comprising a signal-controlled circuit breaker on the electrical circuit, and wherein the sensor signals the circuit breaker to open when the sensor detects the arc flash condition.

6. The arc flash eliminator of claim 4, wherein the gap between the gap electrodes has a lower electrical impedance than any other gaps or other insulation between the electrically different portions of the electrical circuit when the arc triggering device ionizes the portion of gas or injects a plasma between the electrodes.

7. The arc flash eliminator of claim 4, wherein the arc triggering device comprises a triggering electrode that triggers the protective arc by means of a voltage or current pulse to attain electrical breakdown of the gas.

8. The arc flash eliminator of claim 4, wherein the arc triggering device comprises a plasma gun with a divergent nozzle that injects a plasma into the gap between the gap electrodes to initiate the protective arc between the gap electrodes.

9. The arc flash eliminator of claim 4, wherein the ablative plasma gun injects a plasma conductive enough to enable a current in the protective arc that opens the circuit breaker.

10. The arc flash eliminator of claim 4 wherein the enclosed case comprises an inner acoustic shock wave absorbent layer.

11. An arc flash eliminator comprising;
    a first arc crowbar comprising at least two electrodes separated from each other by a gap, each of the electrodes connected to a phase or neutral or ground of an electrical circuit, and an arc triggering device located between the electrodes that initiates a protective arc between the electrodes;
    a trigger circuit that generates a trigger pulse to the arc triggering device;
    a sensor for detecting an arc flash condition on the electrical circuit;
    the sensor connected to a logic circuit that sends a signal to the trigger circuit commanding it to generate the trigger pulse when the sensor detects the arc flash condition; and
    wherein the protective arc absorbs energy from the electrical circuit to eliminate the arc flash condition on the electrical circuit,
    wherein the triggering device comprises an ablative plasma gun that injects a plasma of an ablated material into the gap between the electrodes to initiate the protective arc between the electrodes.

12. The arc flash eliminator of claim 11, further comprising a signal-controllable circuit breaker on the electrical circuit, the circuit breaker connected by a signal line to the logic circuit, wherein the logic circuit commands the circuit breaker to open when the sensor detects the arc flash condition on the electrical circuit.

13. The arc flash eliminator of claim 12, wherein the ablative plasma gun injects a plasma that enables sufficient current in the protective arc to open a circuit breaker on the electrical circuit.

14. The arc flash eliminator of claim 11 wherein the first arc crowbar comprises first and second electrodes separated by a first gap, the first electrode connected to a first phase of the electrical circuit, the second electrode connected to a third phase of the electrical circuit, and further comprising a second arc crowbar comprising third and fourth electrodes separated by a second gap, the third electrode connected to a second phase of the electrical system and the fourth electrode connected to the third phase of the electrical system.

15. The arc flash eliminator of claim 11 wherein the first arc crowbar comprises first and second electrodes separated by a first gap, the first electrode connected to a first phase of the electrical circuit, the second electrode connected to a ground; further comprising a second arc crowbar comprising third and fourth electrodes separated by a second gap, the third electrode connected to a second phase of the electrical system and the fourth electrode connected to the ground; further comprising a third arc crowbar comprising fifth and sixth electrodes separated by a third gap, the fifth electrode connected to a third phase of the electrical system and the sixth electrode connected to the ground.

16. The arc flash eliminator of claim 11 wherein said at least two electrodes and the arc triggering device are enclosed in a pressure-tolerant case comprising a pressure release vent with a particulate filter.

* * * * *